Figure 1:
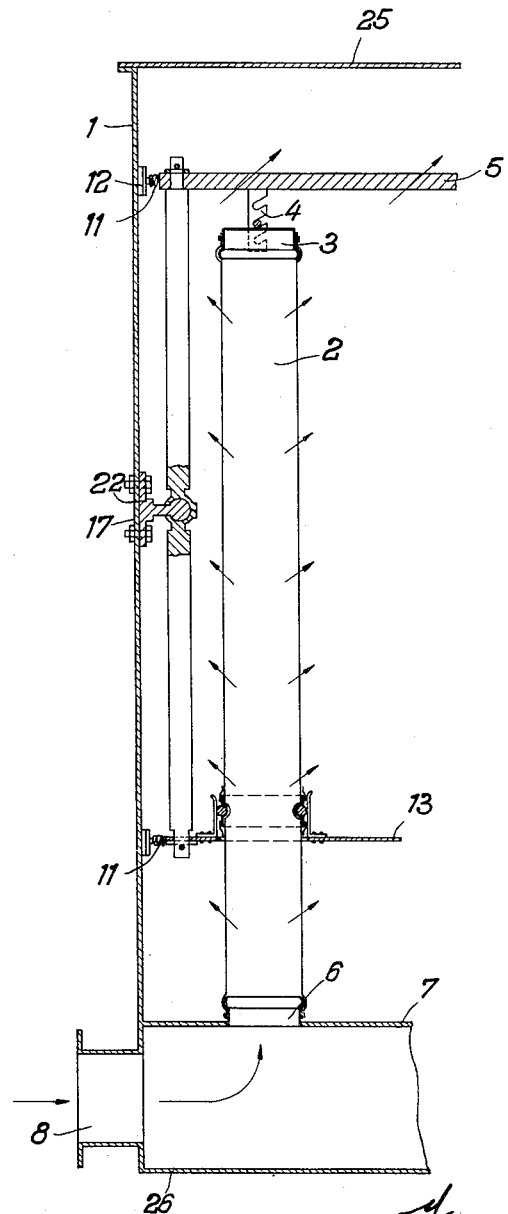

Oct. 30, 1956 G. FISCHER 2,768,706
TUBE FILTER INSTALLATIONS
Filed May 17, 1954 2 Sheets-Sheet 1

Georg Fischer
Inventor:
by Mason, Porter, Diller & Stewart
Attorneys

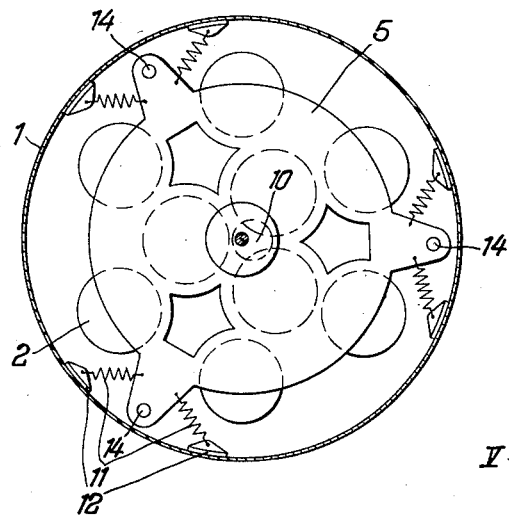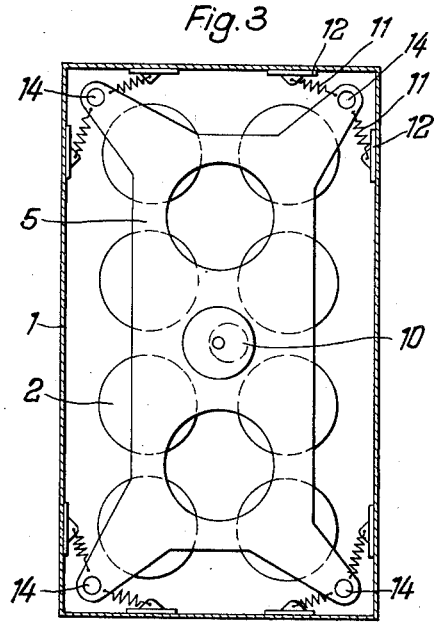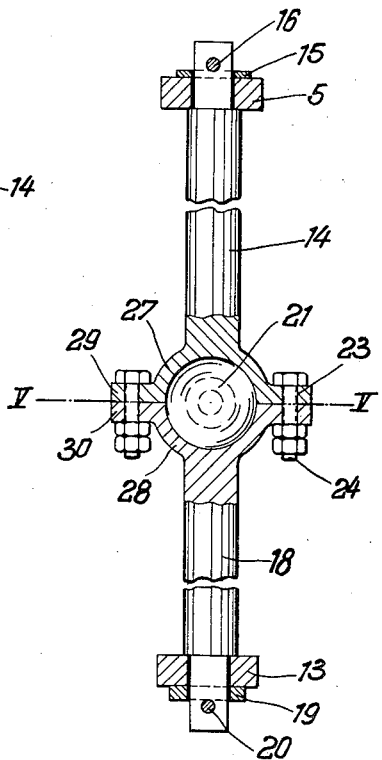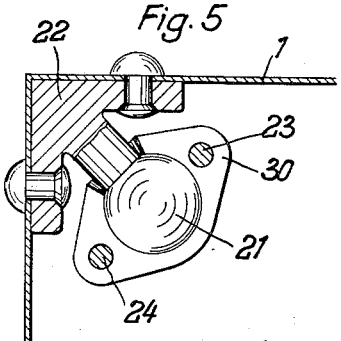

2,768,706
TUBE FILTER INSTALLATIONS

Georg Fischer, Porz am Rhine, Germany

Application May 17, 1954, Serial No. 430,352

Claims priority, application Germany May 16, 1953

8 Claims. (Cl. 183—58)

This invention relates to tube filter installations having a filter chamber subdivided by a tube plate and has for its object to provide a novel type of arrangement for cleansing the filter tubes.

According to the invention, the filter tubes fixed in known manner at their one ends to sockets of the tube plate extend through an intermediate frame adapted to vibrate in a plane at right-angles to the tube axis and are connected to the said frame, and are suspended tightly streached on a frame which is adapted to vibrate in a plane parallel to the plane of vibration of the intermediate frame and which is connected to the latter by rods or the like pivotally mounted between their ends, this mounting being advantageously effected by stationary ball joints or other stationary joints which are universally movable and which are carried either by the housing of the filter chamber or by a structure independent of the latter.

Provision is further made according to the invention for the upper frame supporting the tube ends and set vibrating by an unbalanced device or the like, the intermediate frame, or both frames, to be resiliently suspended in their vibration planes opposite a fixed part of the filter chamber.

This method of suspending the filter tubes has numerous advantages. The main advantage is that the tubes are not, as hitherto, cleaned by axial relaxing and tensioning operations, which results in a very rapid wear of the filter tubes, but by vibrating or shaking the tube walls in planes disposed at right-angles to the tube axis, it being possible for these vibrational or shaking motions to be distributed as far as possible uniformly over the entire length of the tube. A further advantage consists in that the cover of the filter housing is completely relieved of the weight of the tubes and their suspension; this weight may in accordance with the invention be taken up by the jacket of the filter chamber housing, which jacket has much greater power of resistance and above all is much less likely to vibrate, or may even be taken up by a separate construction which is independent of the filter chamber housing, as will be more fully explained hereinafter, so that the housing of the filter chamber is completely relieved.

Further features and advantages of the invention will be apparent from the following description of one constructional example of a tube filter installation which is constructed in accordance with the invention and which is shown in the drawing, wherein:

Figure 1 is a vertical section through a part of a filter chamber constructed in accordance with the invention, Figures 2 and 3 are plan views of the filter chamber according to Figure 1 with the cover of the housing removed, it being assumed according to Figure 2 that the filter chamber of Figure 1 has a circular cross-section, while it is assumed according to Figure 3 that the cross-section of the filter chamber in Figure 1 is rectangular, Figure 4 shows on a larger scale and in vertical section one advantageous embodiment of the pivotally mounted rods connecting the upper tube frame to the intermediate frame, and Figure 5 is a transverse section on the line V—V of Figure 4, at the same time illustrating the fitting of a ball joint on the housing of the filter chamber to serve as the joint for the said rods.

The housing of the filter chamber comprises a jacket 1, which is closed at the upper end by a cover 25 and is provided at the bottom end with a base 26 and a lateral inlet 8 for dust-laden air. The base 26 of the filter chamber is advantageously made funnel-shaped and provided at its bottom end with an outlet for the dust. The internal space of the filter chamber is subdivided by a tube plate 7, which is provided with sockets 6 to which the filter tubes 2 are fixed in a well-known manner.

The filter tubes are closed at their upper ends by a tube cover 3 and are suspended tightly stretched on an upper tube frame 5. This suspension is effected by a transverse rod extending laterally across the tube cover and fixed to the top of the latter, said rod being engaged at its ends in a pair of serrated bars 4 fixed to the underside of the frame 5.

Located between the tube plate 7 and the upper tube frame 5 is an intermediate frame 13 provided with a number of openings which correspond to the number of tubes of the filter chamber and through which the filter tubes 2 extend. The filter tubes are so connected to the intermediate frame 13 (by a separate device which is not part of the present invention and is therefore also not described in greater detail) that they follow all movements of the intermediate frame.

The upper tube frame 5 and the intermediate frame 13 are interconnected by a number of rods 14, 18 and these rods are pivotally mounted at 17 on the jacket 1 of the filter chamber housing. In the constructional example which is illustrated, the pivotal mounting is effected by a ball joint bearing 21, the ball of which is enclosed by two ball sockets 27, 28, one of which, viz: the ball socket 27, is mounted on the end of the rod section 14, while the other ball socket 28 is at the end of the rod section 18. The two ball sockets are provided with flanges 29, 30 in which are formed holes 23 through which extend screw bolts 24 for the tight connection of the flanges to one another.

The number of rods 14, 18 depends on the type and size of the filter chamber. If the filter chamber has a circular cross-section (Figure 2), three pairs of rods 14, 18, distributed over the periphery of the chamber are usually sufficient. On the other hand, if the filter chamber is of rectangular cross-section (Figure 3), it is recommended to fit four pairs of rods 14, 18 in the vicinity of the corners of the chamber. With large area filters, the fitting of more than four rods may be necessary.

Figure 5 illustrates a ball joint 21 for a filter chamber which is of rectangular cross-section. The ball joint is seated on a base element or bracket 22 which is rectangular in cross-section and is fixed by rivets 31 or the like in the corner of the chamber. This fixing method and the method of constructing the ball joint support have the advantage that one and the same type of ball joint support may be used for all rectangular filter chambers, regardless of their size. If the filter chamber is of circular cross-section, the outer limitation of the base element of the ball joint must be adapted to the radius of curvature of the chamber.

That end of the rod 14 which is remote from the ball joint 21 is connected to the upper tube frame 5 by the fact that, as will best be seen from Figure 4, it is pushed with its reduced end through an opening in this frame and is secured by a pin 16 with interposition of a washer 15. In a similar manner, the reduced thinner end of the rod 18 is pushed through an opening in the intermediate frame 13 and is fixedly mounted by a pin 20 with interposition of a washer 19.

The upper tube frame 5 has imparted to it circulatory vibrations in its own plane, that is to say, at right-angles to the tube axis, by means of an unbalanced member 10 engaging at the centre thereof. In order that these vibrations may be uniformly developed, the frame 5 is spring-mounted at its periphery in relation to the jacket 1 of the filter chamber housing. The suspension is effected by pairs of tension springs 11, 11, which engage at one end on the frame 5 and at the other end on spring holders 12 which are mounted fast on the housing jacket 1. The springs are dimensioned corresponding to the frequency of the vibrations imparted to the frame 5 and are so arranged that they are mutually tensioned and hold the frame in floating suspension in the middle position when the unbalanced or eccentric device 10 is stopped. The number of pairs of springs corresponds to the number of pairs of rods 14, 18.

As already stated, the frame 5 has circulatory vibrations imparted to it by the unbalanced device. Since the frame 5 is connected to the intermediate frame 13 by the rods 14, 18 and these are mounted centrally of their length on ball joints in accordance with Figure 1, the intermediate frame 13 will also have vibratory movements imparted to it, at the same time as the frame 5, these vibrations being of the same amplitude but oppositely directed. The result of this is that also the filter tubes 2 fixed to the frame 5 and extending through the intermediate frame 13 are caused to vibrate in opposite directions perpendicular to the tube axis and are thereby cleaned.

If it is desired, for example, that the vibratory movements imparted to the tubes at their point of contact with the intermediate plate 13 should be larger than those vibratory movements imparted to the upper ends of the tubes, then the ball joints are not arranged equidistantly between the two frames 5 and 13, but are more in the region of the upper end of the filter tubes 2, by shortening the rods 14 and correspondingly lengthening the rods 18. On the other hand, if a larger vibratory movement is to be imparted to the upper ends of the filter tubes than to the places at which the tubes pass through the intermediate plate 13, the ball joints 21 are to be displaced more towards the intermediate frame. It is thus possible, by shifting the ball joints upwardly or downwardly, for the lever ratio of the rods 14, 18 and thus the ratio of the amplitudes of the vibrations of the frames 5 and 13 to be modified in relation to one another in such manner as is most advantageous as regards type and quantity of the dust and also as regards the type and quality of the filter material.

In order to be able readily to adapt the position of the ball joint to the prevailing conditions, which is of importance more especially for the conversion of already existing tube filter installations, it is recommended not to make the ball sockets 27 and 28 in one piece with their associated rods 14 and 18, but to arrange for the rods 14 and 18 to have, for example, a screw-threaded connection with their ball sockets. It is then readily possible to select shorter or longer rods as required—according to the construction of the filter and according to the position of the ball joints relatively to the frames 5 and 13.

As will be seen from the foregoing description and from the drawing, the total weight of the filter tubes, inclusive of the devices necessary for their suspension, is no longer supported by the cover 25 of the housing of the filter chamber, but by the jacket 1 of the said housing. It is also possible to relieve this jacket of the weight entirely if a separate support structure for the ball joints is provided in the filter chamber independently of the housing. This has the advantage that then the housing of the filter chamber may also be made of materials which do not bear supplementary loads or are not capable of being riveted or the like.

I claim:

1. In a dust collector having a chamber, a lower transverse partition and an upper transverse frame, a gyrating member for vibrating said frame, a series of dust-collecting tubes suspended from said frame and fixedly attached to the partition, an intermediate frame holding the tubes at an intermediate point, universal bearings mounted on the inside wall of the chamber between the said two frames and pairs of rods journaled on said bearings and supporting the said frames.

2. In a dust collector having a chamber, a lower transverse partition and an upper transverse frame, a member for vibrating said frame transversely, a series of dust-collecting tubes suspended from said frame and fixedly attached to the partition, an intermediate frame holding the tubes at an intermediate point, universal bearings mounted on the inside wall of the chamber between the said two frames and pairs of rods journaled on said bearings and supporting the said frames.

3. In a dust collector having a chamber, a lower transverse partition and an upper transverse frame, a gyrating member for vibrating said frame, a series of dust-collecting tubes suspending from said frame and fixedly attached to the partition, an intermediate frame holding the tubes at an intermediate point, brackets mounted on the inside wall of the chamber between the said two frames, universal bearings on the brackets and pairs of rods journaled on said bearings and supporting the said frames.

4. In a duct-collector having a rectangular chamber, a lower transverse partition and an upper transverse frame, a gyrating member for vibrating said frame transversely, a series of dust-collecting tubes suspended from said frame and fixedly attached to the partition, an intermediate frame holding the tubes at an intermediate point, universal bearings mounted in the corners of the inside wall of the chamber between the said two frames and pairs of rods journaled on said bearings and supporting the said frames.

5. In a dust-collector having a chamber, a lower transverse partition and an upper transverse frame, a gyratory member for vibrating said frame, a series of dust-collecting tubes suspended from said frame and fixedly attached to the partition, an intermediate frame holding the tubes at an intermediate point, universal bearings mounted on the inside wall of the chamber at a point midway between said two frames and pairs of rods journaled on said bearings and supporting the said frames.

6. In a dust-collector having a chamber, a lower transverse partition and an upper transverse frame, a gyratory member for vibrating said frame, a series of dust-collecting tubes suspended from said frame and fixedly attached to the partition, an intermediate frame holding the tubes at an intermediate point, universal bearings mounted on the inside wall of the chamber at a point unequally spaced between said two frames and pairs of rods journalled on said bearings and supporting the said frames.

7. In a dust-collector having a chamber, a lower transverse partition and an upper transverse frame, a gyratory member for vibrating said frame, a series of dust-collecting tubes suspended from said frame and fixedly attached to the partition, an intermediate frame holding the tubes at an intermediate point, universal bearings mounted on the inside wall of the chamber between the said two frames and rods connecting the frames to the bearings, said rods having their adjacent ends formed with socket members to receive said bearings.

8. In a dust-collector having a chamber, a lower transverse partition and an upper transverse frame, a gyratory member for vibrating said frame, a series of dust-collecting tubes suspended from said frame and fixedly attached to the partition, an intermediate frame holding the tubes at an intermediate point, universal bearings mounted on the inside wall of the chamber between the said two frames, pairs of rods journaled on said bearings and supporting the said frames and springs connecting the frames to the chamber opposite their points of attachment to the rods.

References Cited in the file of this patent

UNITED STATES PATENTS

| | | |
|---|---|---|
| 1,356,086 | Plaisted | Oct. 19, 1920 |
| 1,743,934 | Ruemelin | Jan. 14, 1930 |
| 2,335,315 | Seymour | Nov. 30, 1943 |

FOREIGN PATENTS

| | | |
|---|---|---|
| 17,899 | France | Oct. 8, 1913 |
| | (Addition to No. 445,994) | |
| 332,475 | Great Britain | July 24, 1930 |
| 402,087 | Italy | May 19, 1942 |
| 445,994 | France | Sept. 19, 1912 |